(12) United States Patent
Saracco (10) Patent No.: US 6,691,097 B1
(45) Date of Patent: Feb. 10, 2004

(54) TECHNIQUE FOR DETECTING A SHARED TEMPORAL RELATIONSHIP OF VALID TIME DATA IN A RELATIONAL DATABASE MANAGEMENT SYSTEM

(75) Inventor: Cynthia M. Saracco, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,325

(22) Filed: Jan. 28, 2000

(51) Int. Cl.[7] .............................................. G06F 17/30
(52) U.S. Cl. .................................. 707/1; 707/7; 707/8
(58) Field of Search .............................. 707/1–2, 6–10, 707/100–104, 200–203, 205, 500–500.1, 509; 717/100; 715/509

(56) References Cited

U.S. PATENT DOCUMENTS

| | | |
|---|---|---|
| 5,233,513 A | 8/1993 | Doyle |
| 5,418,943 A | 5/1995 | Borgida et al. |
| 5,440,730 A * | 8/1995 | Elmasri et al. ............. 707/203 |
| 5,600,831 A | 2/1997 | Levy et al. |

OTHER PUBLICATIONS

Allen, J.F., "Maintaining Knowledge about Temporal Intervals," *Communications of the ACM*, vol. 26, No. 11, Nov. 1983.

Darwen, H. et al., "Temporal Databases", Ch. 22 in C.J. Date's An Introduction to Database Systems (7th edition), Addison–Wesley, 1999.

Snodgrass, Richard T., "Developing Time–Oriented Database Applications in SQL", Morgan Kaufmann Publishers, 1999 (expected publication date).

* cited by examiner

*Primary Examiner*—Alford Kindred
(74) *Attorney, Agent, or Firm*—Gates & Cooper LLP (57) ABSTRACT

A method, apparatus, and article of manufacture for detecting shared temporal relationships in a relational database. In accordance with the present invention, an invocation of a shares operation that specifies a first event and a second event is received. In response to the invocation, a combination of temporal relationships between the first event and the second event are evaluated to determine whether (1) the second event ends after the first event starts and the first event ends after the second event starts or (2) the first and second events start and end at the same time.

24 Claims, 3 Drawing Sheets

| OPERATOR 200 | RELATIONSHIP 202 | GRAPHIC EXAMPLE 204 |
|---|---|---|
| 206 — BEFORE | 220 x BEFORE y 222 | x ———  y ——— |
| 208 — MEETS | x MEETS y | x ——— y ——— |
| 210 — OVERLAPS | x OVERLAPS y | x ———  y ——— |
| 212 — DURING | x DURING y | x ——— y ——————— |
| 214 — STARTS | x STARTS y | x ——— y ——————— |
| 216 — FINISHES | x FINISHES y | x ——— y ——————— |
| 218 — EQUAL | x EQUAL y | x ——— y ——— |

TECHNIQUE FOR DETECTING A SHARED TEMPORAL RELATIONSHIP OF VALID TIME DATA IN A RELATIONAL DATABASE MANAGEMENT SYSTEM

CROSS-REFERENCE TO RELATED APPLICATIONS

This application is related to co-pending and commonly-assigned patent application Ser. No. 09/493,832, filed on Jan. 28, 2000 by Cynthia M. Saracco, entitled "TECHNIQUE FOR DETECTING A SUBSUMING TEMPORAL RELATIONSHIP OF VALID TIME DATA IN A RELATIONAL DATABASE MANAGEMENT SYSTEM," which application is incorporated by reference herein.

BACKGROUND OF THE INVENTION

1. Field of the Invention

This invention relates in general to relational database management systems, and, in particular, to a technique for detecting a shared temporal relationship of valid time data in a relational database management system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

A data warehouse is a combination of many different databases across an entire enterprise. Data warehouses contain a wide variety of data that presents a coherent picture of business conditions at a single point in time. As a result, many companies use data warehouses to support management decision making. A data mart is similar to a data warehouse. The only difference between the data mart and the data warehouse is that data marts are usually smaller than data warehouses, and data marts focus on a particular subject or departments. Both the data warehouse and the data mart use the RDBMS for storing and retrieving information.

Companies frequently use data warehouses and data marts to create billions of bytes of data about all aspects of a company, including facts about their customers, products, operations, and personal. Many companies use this data to evaluate their past performance and to plan for the future. To assist the companies in analyzing this data, some data warehousing and decision support professionals write applications and generate reports that seek to shed light on a company's recent business history.

Several common forms of data analysis involve evaluating time-related data, such as examining customer buying behaviors, assessing the effectiveness of marketing campaigns or determining the impact of organizational changes on sales during a selected time period. The relevance of time-related data to a variety of business applications has caused some DBMS professionals to reexamine the need for temporal data analysis.

Temporal data is often used to track the period of time at which certain business conditions are valid. To illustrate, a company may sell product X for: $50 during a first period of time; $45 during a second period of time; and $52 during a third period of time. The company may even know that this same product will sell for $54 during some future period of time. When the company's database contains information about the valid times for each of these price points, the pricing points are referred to as temporal data. Common techniques for recording valid time information in a RDBMS involve including a DATE column in a table that tracks business conditions, such as a START_DATE and an END_DATE column in a table that tracks pricing information for products.

Analyzing temporal data involves understanding the manner in which different business conditions relate to one another over time. Returning to the previous example, each product has a retail price for a given period of time, and each product also has a wholesale cost. Retail prices can fluctuate independently of the product's wholesale cost, and vice versa. To determine efficiencies (or inefficiencies) in a product's pricing scheme, a retailer may wish to understand the relationship between a product's retail price and a product's wholesale cost over time. More specifically, a retailer may wish to evaluate: whether products are being placed on sale at inopportune times (e.g., before the retailer is eligible to receive a reduction in wholesale price) or whether the retailer has failed to pass on cost savings to customers (e.g., failing to place products on sale during the period in which their wholesale cost is reduced).

These questions involve temporal analysis because the questions involve tracking the period of time at which certain business conditions were in effect. These questions can be challenging to express in SQL, and many users are incapable of correctly formatting such SQL queries. Further, mistakes in the SQL query are common and difficult to detect.

Thus, there is a need in the art for a technique of creating a simplified SQL query to analyze the temporal relationship of various business conditions.

SUMMARY OF THE INVENTION

To overcome the limitations in the prior art described above, and to overcome other limitations that will become apparent upon reading and understanding the present specification, the present invention discloses a method, apparatus, and article of manufacture for detecting shared temporal relationships in a relational database.

In accordance with the present invention, an invocation of a shares operation that specifies a first event and a second event is received. In response to the invocation, a combination of temporal relationships between the first event and the second event are evaluated to determine whether (1) the second event ends after the first event starts and the first event ends after the second event starts or (2) the first and second events start and end at the same time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
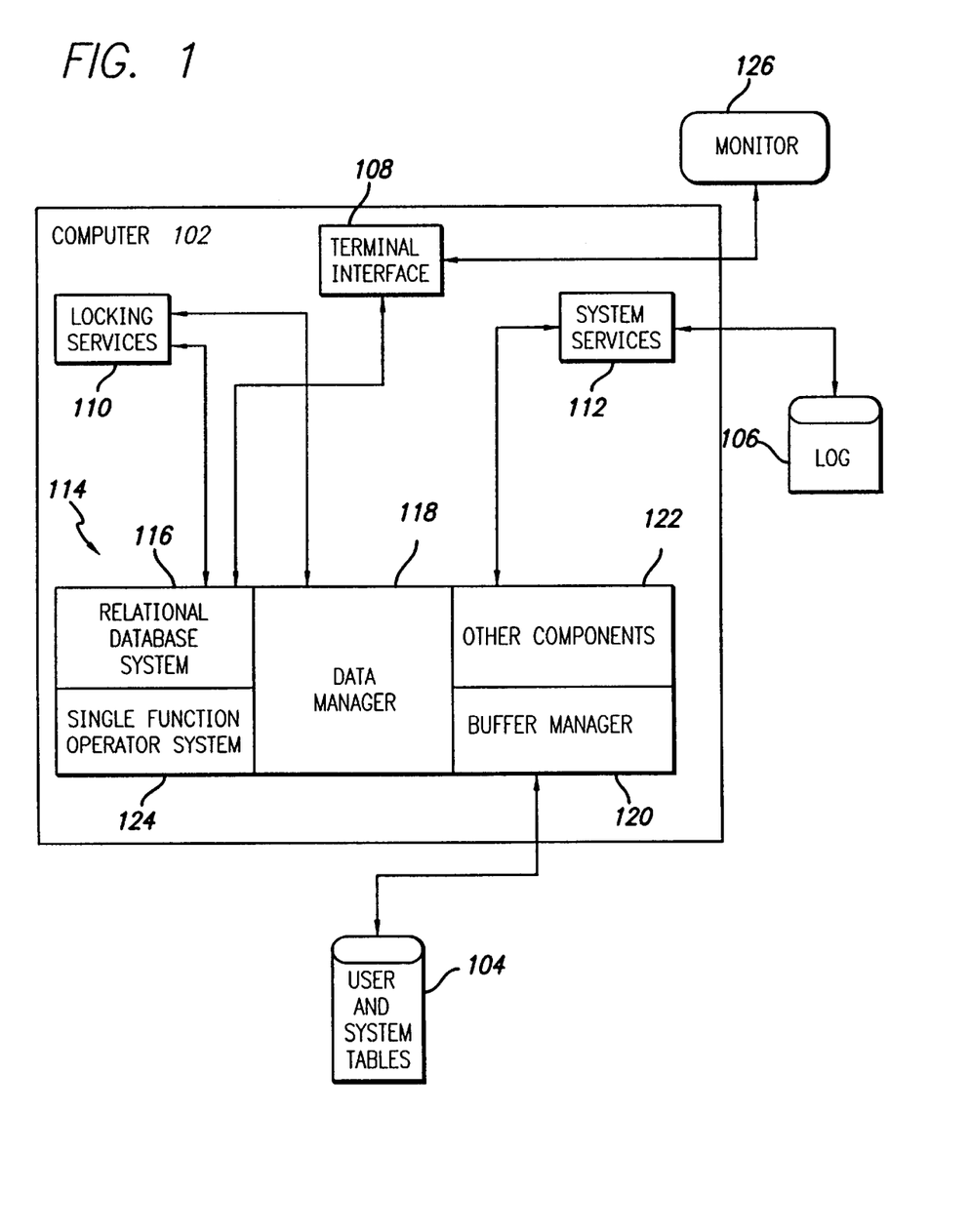
FIG. 1 schematically illustrates a hardware environment of a preferred embodiment of the present invention.

FIG. 1 illustrates a computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® UDB V5.2 product offered by IBM for the Windows NT 4.0 operating systems. Those skilled in the art will recognize, however, that the present invention has application program to any RDBMS software, whether or not the RDBMS software uses SQL.

As illustrated in FIG. 1, the DB2® UDB V5.2 system for the Windows NT 4.0 operating system includes three major components: the Internal Resource Lock Manager (IRLM) 110, the Systems Services module 112, and the Database Services module 114. The IRLM 110 handles locking services for the DB2® UDB V5.2system, which treats data as a shared resource, thereby allowing any number of users to access the same data simultaneously. Thus concurrency control is required to isolate users and to maintain data integrity. The Systems Services module 112 controls the overall DB2® UDB V5.2 execution environment, including managing log data sets 106, gathering statistics, handling startup and shutdown, and providing management support.

At the center of the DB2® UDB V5.2 system is the Database Services module 114. The Database Services module 114 contains several submodules, including the Relational Database System (RDS) 116, the Data Manager 118, the Buffer Manager 120, the Rebalancing System 124, and other components 122 such as an SQL compiler/interpreter. These submodules support the functions of the SQL language, i.e. definition, access control, interpretation, compilation, database retrieval, and update of user and system data. The Single Function Operator System 124 works in conjunction with the other submodules to provide a single function operator that simplifies the process of detecting and tracking shared temporal relationships.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Single Function Operator System

The growing interest in advanced data analysis techniques—prompted, in part, by increased use of data warehouses, data marts, and other decision support environments—has led some DBMS professionals to revisit the need for temporal data analysis. Such analysis attempts to discern the manner in which the states of things (e.g., product content, product pricing, product promotions, product management, etc.) vary over time and the manner in which these different states may be inter-related.

For example, a product may sell at its standard retail price for certain periods of time, while at other times it may sell at various discounted rates. Furthermore, this same product may cost the retailer different prices at different periods of time (perhaps due to a manufacturer's rebate offer). Understanding the relationship between the product's various states of pricing can be important when determining the effectiveness of the product's pricing strategy and assessing profits on the product's sales.

The examples discussed herein involve retail-oriented databases with a star schema architecture. The retail industry is used because of its commercial significance in the data warehousing and decision support fields and because members of the retail industry tend to be interested in temporal analysis. However, the single function operator system 124 is applicable to other industries.

Some forms of temporal analysis are challenging to express using current commercial technology. Researchers have argued that these commercial limitations may place an undue burden on DBMS users in the future, as data warehouses are likely to store greater quantities of historical data.

Temporal data tracks state-related information. This often translates into recording the time period for which a given condition was (or is or will be) valid. An example of temporal data is shown below in Table 1 and Table 2. Specifically, Table 1 and Table 2 contain information about Grace Theophila's salary and job titles over time. Grace Theophila is a fictional employee. Date information is shown in the MM/DD/YYYY format.

TABLE 1

| ID  | NAME           | SALARY | START_DATE | END_DATE   |
|-----|----------------|--------|------------|------------|
| 123 | Grace Theophila | 45,000 | 02/01/1997 | 04/20/1998 |
| 123 | Grace Theophila | 48,000 | 04/20/1998 | 10/30/1998 |
| 123 | Grace Theophila | 49,500 | 10/30/1998 | 04/04/1999 |
| ... | ...            | ...    | ...        | ...        |

TABLE 2

| ID  | NAME           | TITLE         | START_DATE | END_DATE   |
|-----|----------------|---------------|------------|------------|
| 123 | Grace Theophila | Asst Manager  | 02/01/1997 | 12/01/1997 |
| 123 | Grace Theophila | Manager       | 12/01/1997 | 04/04/1999 |
| ... | ...            | ...           | ...        | ...        |

Both Table 1 and Table 2 track valid time information about different business conditions. Table 1 records salary information for employees throughout various periods of time, and Table 2 records employees' job titles throughout various periods of time. The "period" nature is a characteristic of temporal data and temporal analysis.

Traditional databases (i.e., databases which focus on currently valid data) rarely model employee salary and job title information in two separate tables, as shown in Table 1 and Table 2. However, for simplicity, a "temporal" database (i.e., one which attempts to track historical information and, possibly, current and future information as well) may model data in separate tables. An employee's salaries and job titles can vary over time, independently of one another. Storing both pieces of information in a single temporal table forces the DBMS professional to design the database in the following manner either: (1) retain only one start/end date pair to record the valid time for all the row's content; or (2) include multiple start/end date pairs, each recording the valid time for a single part of the row's content. Each of these design options increases the complexity of the temporal analysis. Therefore, in the interest of simplicity and clarity, the single function operator system 124 will be described herein with respect to separate tables for each type of data. However, if desired, the single function operator system 124 can be used with other database designs, e.g., single table designs.

Both Table 1 and Table 2 use dates as their level of temporal granularity, because presumably, an employee's salary or job title remains constant for a single day. However, temporal data can be recorded at coarser or finer levels of granularity. The START_DATE represents the first day on which the condition became true, and the END_DATE represents the first day thereafter in which the condition failed to remain true. For example, beginning Feb. 1, 1997, Grace had a salary of $45,000 per year. Grace continued to earn this salary until—but not including—Apr. 20, 1998. This technique of modeling temporal data is sometimes referred to as a "closed-open" representation in research literature. Of course, other representations of the data are possible without exceeding the scope of the single function operator system 124.

Many of the underlying principles for a preferred embodiment of the single function operator system 124 are based on the theoretical work of J. F. Allen, who identified a set of operators (commonly referred to as Allen's operators) that can be used to assess temporal relationships. Allen's operators can be expressed in a variety of languages, including SQL.

Figure 2:
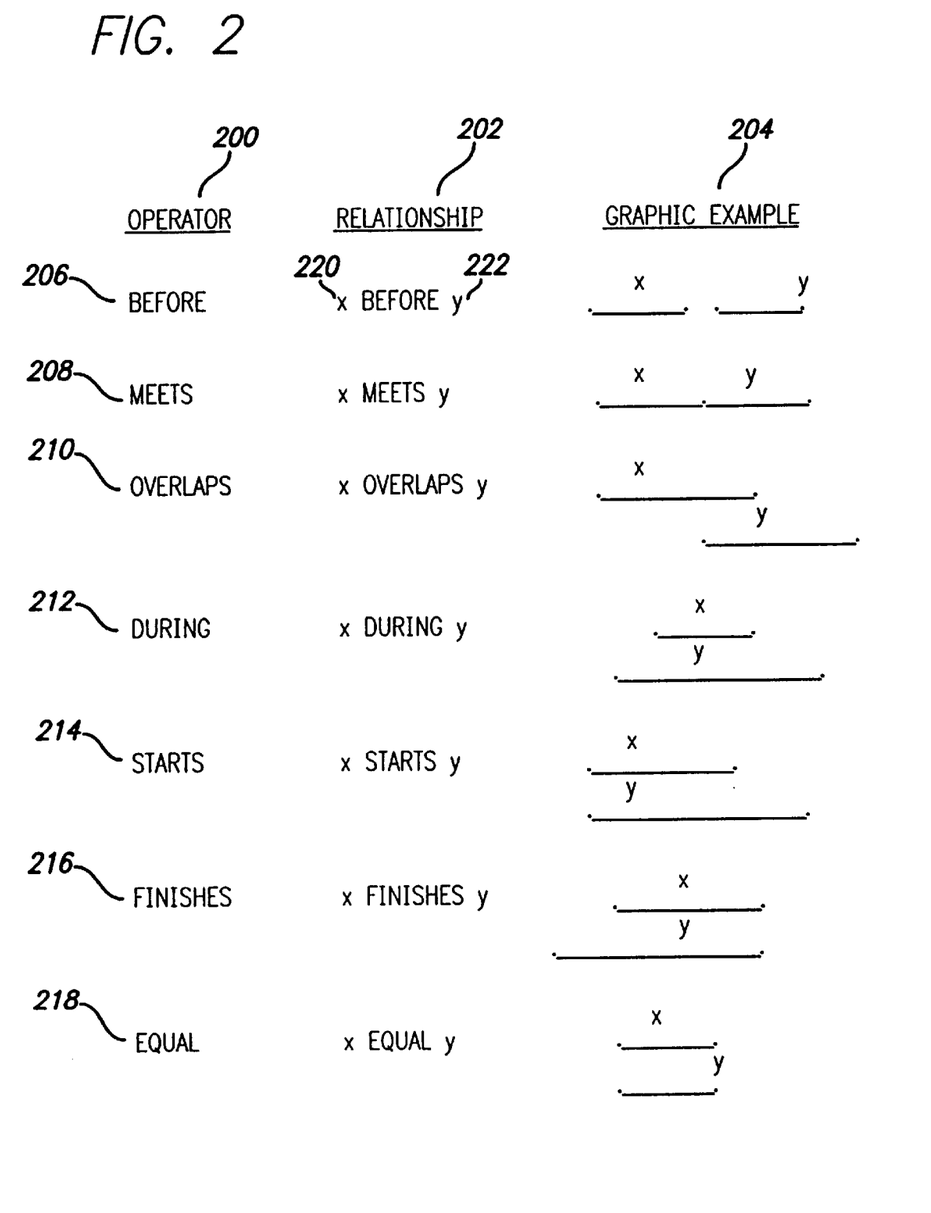
FIG. 2 illustrates seven temporal relationship operators.

Allen's operators are shown in FIG. 2. FIG. 2 has an OPERATOR column 200, a RELATIONSHIP column 202, and a GRAPHIC EXAMPLE column 204. The OPERATOR column 200 contains seven of Allen's operators, including BEFORE 206, MEETS 208, OVERLAPS 210, DURING 212, STARTS 214, FINISHES 216, and EQUAL 218. These operators 206, 208, 210, 212, 214, 216, and 218 perform a comparison operation. The result of each comparison operation yields a TRUE or FALSE value. The RELATIONSHIP column 202 shows the relationship between a time period X 220 and a time period Y 222. The GRAPHIC EXAMPLE column 204 displays a graphical representation of the relationship between the time period X 220 and the time period Y 222. Other Allen's operators include MET BY, OVERLAPPED BY, STARTED BY, and FINISHED BY. The results of these operators also produce a TRUE or FALSE value.

The preferred embodiment of the single function operator system 124 combines some of the operators 206, 208, 210, 212, 214, 216, and 218 into a single function. Combining some of the operators 206, 208, 210, 212, 214, 216, and 218 simplifies certain queries and helps reduce the number of lines of SQL code. More specifically, an embodiment of the single function operator system 124 provides a WITHIN operator that combines the EQUAL 218, DURING 212, STARTS 214, and FINISHES 216 operators into a single function operator. The WITHIN operator returns a TRUE value when the time period X 220 is wholly or partly contained within the time period Y 222.

Another embodiment of the present invention provides a SHARES operator. The SHARES operator is similar to the WITHIN operator. Like the WITHIN operator, the SHARES operator combines the EQUAL 218, DURING 212, STARTS 214, and FINISHES 216 operators into a single function operator. The difference between the WITHIN operator and the SHARES operator is that the SHARES operator adds the following operators to the combination: OVERLAPS 210, OVERLAPPED BY, CONTAINS, STARTED BY, and FINISHED BY. The SHARES operator returns a TRUE value when time period X 220 shares any time in common with time period Y 222.

To illustrate the benefits of the SHARES operator, the SHARES operator is used to extract data from Table 3 and Table 4. Table 3 represents a Store database. The Store database records data about stores and the districts to which each store reports. Table 3 contains five columns, a SID column, a STORE_NAME column, a DID column, a ORG_START column, and ORG_END column.

The SID column contains a store identifier. The STORE_NAME column contains the name of store. The DID column contains the district identifier of the district that the store reports to. The ORG_START column contains the start date of the store-to-district reporting structure, and the ORG_END column contains the end date of the store-to-district reporting structure.

TABLE 3

| SID | STORE_NAME | DID | ORG_START | ORG_END |
|---|---|---|---|---|
| 0 | Acme 0 | 7 | 05/06/1998 | 07/20/1998 |
| 0 | Acme 0 | 6 | 01/01/1998 | 05/06/1998 |
| 1 | Acme 1 | 7 | 04/20/1998 | 05/05/1998 |
| 2 | Acme 2 | 6 | 01/01/1998 | 09/30/1998 |
| 2 | Acme 2 | 7 | 09/30/1998 | 12/30/1998 |
| 3 | Acme 3 | 5 | 01/10/1998 | 12/30/1998 |
| 4 | Acme 4 | 5 | 09/01/1998 | 12/30/1998 |
| ... | ... | ... | ... | ... |

Table 4 represents a District database. The District database records data about the districts and about the districts associated trading area. Table 4 contains five columns: a DID column that contains a district identifier; a D_NAME column that contains a district name; a TID column that contains an identifier of the trading area that the districts reports to; an ORG_START column that contains a start date of the reporting structure, and an ORG_END column that contains an end date of the reporting structure.

TABLE 4

| DID | D_NAME | TID | ORG_START | ORG_END |
|---|---|---|---|---|
| 5 | Valley District | 11 | 01/01/1998 | 07/30/1998 |
| 6 | Springs District | 11 | 05/30/1998 | 12/30/1998 |
| 6 | Lakes District | 12 | 01/01/1998 | 05/30/1998 |
| 7 | Mountain District | 12 | 02/04/1998 | 11/30/1998 |
| 5 | Willows District | 12 | 07/30/1998 | 08/30/1998 |
| 6 | Waterfront District | 9 | 01/01/1997 | 12/30/1997 |
| ... | ... | ... | ... | ... |

As an example, assume that a query seeks to report the names of stores and the districts which the stores are associated with over time. This type of query is sometimes referred to as a "temporal sequenced join". Such a query might produce a report that cites the name of each store, the name of the district into which the store reported, and the dates for which this store-to-district reporting information is valid. Table 5 represents a sample result.

TABLE 5

| STORE_NAME | D_NAME | ORG_START | ORG_END |
|---|---|---|---|
| Acme 0 | Lakes District | 01/01/1998 | 05/06/1998 |
| Acme 0 | Mountain District | 05/06/1998 | 07/20/1998 |
| Acme 1 | Mountain District | 04/20/1998 | 05/05/1998 |
| Acme 2 | Lakes District | 01/01/1998 | 09/30/1998 |
| Acme 2 | Springs District | 01/01/1998 | 09/30/1998 |

TABLE 5-continued

| STORE_NAME | D_NAME | ORG_START | ORG_END |
|---|---|---|---|
| Acme 2 | Mountain District | 09/30/1998 | 12/30/1998 |
| Acme 3 | Valley District | 01/10/1998 | 12/30/1998 |
| Acme 3 | Willows District | 01/10/1998 | 12/30/1998 |

Some conventional techniques for drafting a query that produces the results contained in Table 5 require four SELECT statements, three UNION statements, and a total of eleven data comparison operations. Each SELECT statement tests for some relationship between the time period of validity for the store-to-district reporting structure. The data comparison operators which implement Allen's operators, test for various temporal relationships. After testing for the temporal relationships, the query then unions the results together. A sample conventional query is shown below:

SELECT store_name, d_name, store.org_start, store.org_end
FROM store, district
WHERE store.did=district.did
and district.org_start<=store.org_start
and store.org_end<=district.org_end
UNION
SELECT store name, d_name, store.org_start, store.org_end
FROM store, district
WHERE store.did=district.did
and store.org_start>district.org_start
and district.org_end<store.org_end
and store.org_start<district.org_end
UNION
SELECT store_name, d_name, store.org_start, store.org_end
FROM store, district
WHERE store.did=district.did
and district.org_start>store.org_start
and store.org_end<district.org_end
and district.org_start<store.org_end
UNION
SELECT store_name, d_name, store.org_start, store.org_end
FROM store, district
WHERE store.did=district.did
and district.org_start>=store.org_start
and district.org_end<=store.org_end
ORDER BY store_name The above query contains four query blocks. Each section of the query that begins with a SELECT statement is a query block. Each query block contains a standard join clause based on the district identification number (i.e., the DID column of the STORE and DISTRICT tables). Each query block also includes a temporal join clause.

To simplify the discussion of the temporal join clauses, assume "P1" denotes the time period specified by the ORG_START and ORG_END dates of the STORE table shown in Table 3, and assume "P2" denotes the time period specified by the ORG_START and ORG_END dates of the DISTRICT table shown in Table 4. Thus, the four query blocks test for the following temporal conditions:

Query Block 1: P1 DURING P2 or P1 EQUAL P2 or P1 STARTS P2

Query Block 2: P2 OVERLAPS P1
Query Block 3: P1 OVERLAPS P2
Query Block 4: P2 DURING P1 or P2 EQUAL P1 or P2 FINISHES P1

While this query produces the intended result set shown in Table 5, many users would experience difficulty formulating this query. In particular, few users are capable of developing the logic and correctly coding the syntax (particularly all the date comparison operators) in a timely manner. Assuming that users store their temporal data in a relational or object/relational DBMS, a user must perform the following steps to formulate the above query: (1) understand the logic of each of the relevant temporal conditions; (2) correctly translate the logic into SQL date comparison operators; (3) formulate appropriate query blocks; and (4) UNION these query blocks together. Such query logic can be difficult to debug, as an error in one date comparison operator will yield incorrect results. However, the that same error will fail to produce an error warning message from the database. In addition to the difficulty in formulating and debugging the SQL query, the execution of the SQL query can cause a database management system to scan the table(s) referenced in the query multiple time (one time for each query block). Such scanning may result in considerable input and output processing and poor performance (e.g., delays in receiving query results).

Fortunately, the single function operator system 124 provides the SHARES operator. The SHARES operator simplifies the above query. More specifically, the SHARES operator eliminates three of the four SELECT statements, all of the UNION statements, and ten of the eleven date comparisons. Using the SHARES operator, the above query can be revised as follows:

SELECT store_name, store.did, d_name, store.org_start, store.org_end
FROM store, district
WHERE store.did=district.did
and shares(store.org_start, store.org_end, district.org_start, district.org_end)=1
ORDER BY store_name, store.did In addition to greatly simplifying the traditional query, the revised query adds a the district identifier (the DID column of Table 4) to the result shown in Table 6.

TABLE 6

| STORE_NAME | DID | D_NAME | ORG_START | ORG_END |
|---|---|---|---|---|
| Acme 0 | 6 | Lakes District | 01/01/1998 | 05/05/1998 |
| Acme 0 | 7 | Mountain District | 05/06/1998 | 07/20/1998 |
| Acme 1 | 7 | Mountain District | 04/20/1998 | 05/05/1998 |
| Acme 2 | 6 | Springs District | 01/01/1998 | 09/30/1998 |
| Acme 2 | 6 | Lakes District | 01/01/1998 | 09/30/1998 |
| Acme 2 | 7 | Mountain District | 09/30/1998 | 12/30/1998 |
| Acme 3 | 5 | Valley District | 01/10/1998 | 12/30/1998 |

In the revised query, the operator that eliminates the most code is the SHARES OPERATOR:

shares(store.org_start, store.org_end, district.org_start, district.org_end)=1

The SHARES function combines several temporal tests into one. A temporal relationship exists when either time period is equal to the other time period, or overlaps with the other time period, or occurred during the other time period, or starts during the other time period, or finishes during the other time period. That is, the two periods share some time in common.

The SHARES operator expects to receive four DATE values as input (each pair containing the start/end points of each time period). The SHARES operator returns a "1" if the test evaluates as TRUE or a "0" if the test evaluates as FALSE.

The WITHIN operator also eliminates the amount of code used in a traditional query. To illustrate the benefit of using the WITHIN operator, the WITHIN operator is used to extract data from Table 7 and Table 8 below.

Table 7 represents a Discount database. The discount database records the retail price discount offered by store for products. Table 7 contains five columns: a PID column, a SID column, a PERCENT_OFF column, a D_START column, and a D_END column. The PID column contains a product identifier. The SID column contains a store identifier. The PERCENT_OFF column contains a discount rate. The D_START column contains a start time for a discount on product. The D_END columns contains the end time for a discount on product.

TABLE 7

| PID | SID | PERCENT_OFF | D_START | D_END |
|---|---|---|---|---|
| 100 | 3 | 5 | 05/01/1998 | 05/30/1998 |
| 200 | 1 | 7 | 04/30/1998 | 05/10/1998 |
| 200 | 2 | 7 | 04/30/1998 | 05/10/1998 |
| 600 | 2 | 5 | 11/30/1998 | 12/05/1998 |
| 500 | 0 | 10 | 02/01/1998 | 02/10/1998 |
| ... | ... | ... | ... | ... |

Table 8 represents a Manu_Special database. The Manu_Special database records a manufacturer's discount offered to retailers. Table 8 contains four columns, a PID column, a PERCENT_OFF column, a S_START column, and a S_END column. The PID column contains the product identifier. The PERCENT_OFF column contains manufacturer's discount rate. The S_START column contains the start date of manufacturer's special pricing. The S_END column contains the end date of manufacturer's special pricing.

TABLE 8

| PID | PERCENT_OFF | S_START | S_END |
|---|---|---|---|
| 100 | 2 | 04/30/1998 | 05/15/1998 |
| 100 | 5 | 07/30/1998 | 08/15/1998 |
| 400 | 10 | 07/30/1998 | 08/30/1998 |
| 600 | 5 | 12/10/1998 | 12/30/1998 |
| 500 | 15 | 01/01/1998 | 02/15/1998 |
| ... | ... | ... | ... |

A sample query is shown below. The query seeks to determine which products were put on sale during a time period X 220, wherein the time period X 220 occurs outside of the time period Y 222. The time period Y 222 represents the time period in which the store was eligible to receive a manufacturer's rebate. In other words, the query seeks to determine if any portion of a product's retail discount period fell outside the manufacturer's rebate period.

SELECT discount.pid, sid, d_start as disc_start,
d_end as disc_end,
s_start as rebate_start,
s_end as rebate_end
FROM discount, manu_special WHERE discount.pid=manu_special.pid and ((d_start<s_start) or (d_end>s_end))

The query contains one query blocks. The query block contains a standard join clause based on the product identification number (i.e., the PID column of the Discount and Manu_Special tables). The query block also includes a temporal join clause. Formulating this temporal join clause is difficult because correct date comparison operations must be specified. In this example, the goal is to produce a result that contains discounted products that fell outside the manufacturer's rebate period—that is, any discounts occurring before or after the rebate period. To simplify the discussion of the temporal join clauses, assume "P1" denotes the time period specified by the D_START and D_END dates of the Discount table shown in Table 7, and assume "P2" denotes the time period specified by the S_START and S_END dates of the Manu Special table shown in Table 8.

While this query produces the intended result set, many people would experience difficulty formulating this query. In particular, few people are capable of developing the logic and correctly coding the syntax (particularly the date comparison operators) in a timely manner. The WITHIN operator simplifies the above query. Using the WITHIN operator, the above query can be revised as follows:

SELECT discount.pid, sid, d_start as disc_start, d_end as disc_end, s_start as rebate_start, s_end as rebate_end FROM discount, manu_special WHERE discount.pid=manu_special.pid and within(d_start, d_end, s_start, s_end)=0

In the revised query, formulating the temporal portion of the query is simple. Namely, the revised query returns those rows that lack the WITHIN condition. Specifying that the query return a "0" or FALSE value produces rows that lack the WITHIN condition.

Figure 3A:
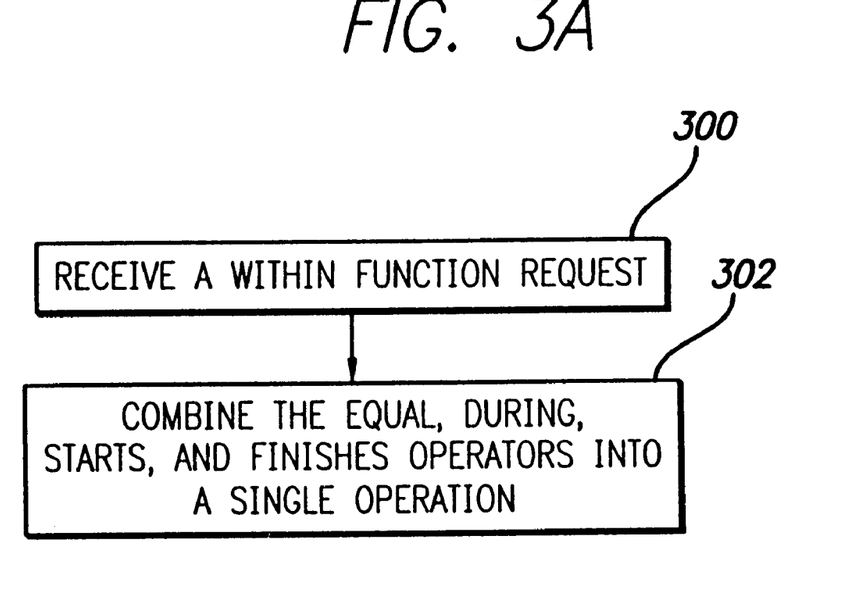
FIGS. 3A–3B are flow charts that illustrate the steps performed by the single function operator system in accordance with an embodiment of the present invention.
Figure 3B:
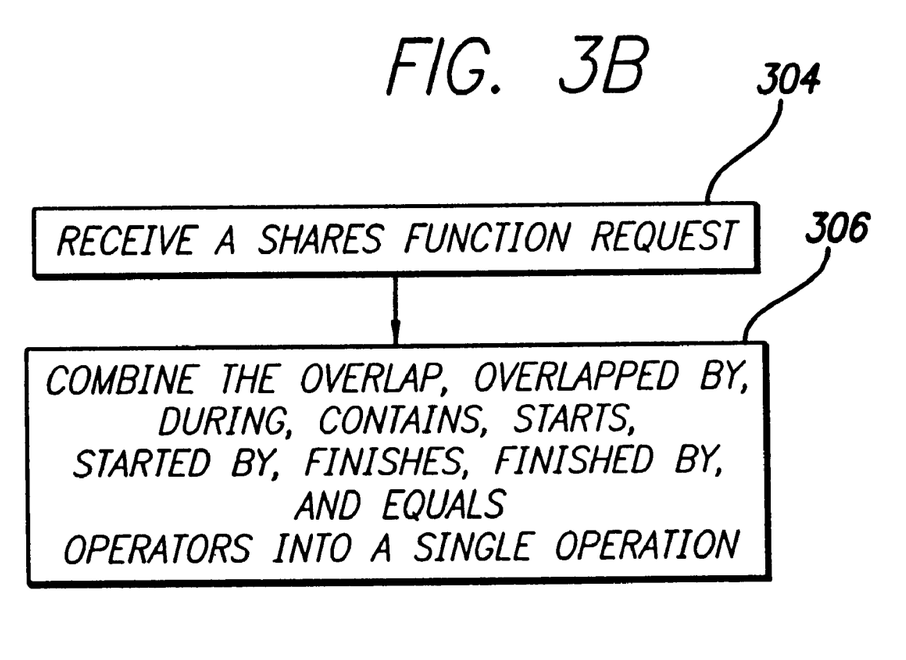

FIGS. 3A and 3B are flow charts illustrating the steps performed by the present invention 124 in accordance with an embodiment of the single function operator system 124. In particular FIG. 3A illustrates the steps performed by the present invention to create a WITHIN operator and FIG. 3B illustrates the steps performed by the present invention to create a SHARES operator.

In FIG. 3A, block 300 represents the single function operator system 124 receiving a WITHIN operator. Block 302 represents the single function operator system logically combining the EQUAL, DURING, STARTS, and FINISHES operators into a single operation represented by the WITHIN operator.

In FIG. 3B, block 304 represents the single function operator system receiving a SHARES operator. Block 306 represents the single function operator system 124 logically combining the OVERLAP, OVERLAPPED BY, DURING, CONTAINS, STARTS, STARTED BY, FINISHES, FINISHED BY, and EQUALS operators into a single operation represented by the SHARES operator.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of detecting shared temporal relationships in a relational database, the method comprises the steps of:

receiving an invocation of a shares operation that specifies a first event and a second event; and in response to the invocation, evaluating a combination of temporal relationships between the first event and the second event to determine whether (a) the second event ends after die first event starts and the first event ends after the second event starts or (b) the first and second events start and end at a same time.

2. The method of claim 1, wherein the evaluating evaluates whether the first event occurs during the second event.

3. The method of claim 1, wherein the method further comprises the step of returning a TRUE value when the shares operation determines that (a) the second event ends after the first event starts and the first event ends after the second event starts or that (b) the first and second events start and end at a same time.

4. The method of claim 1, wherein the method further comprises the step of returning a FALSE value when the shares operation fails to determine that (a) the second event ends after the first event starts and the first event ends after the second event starts or that (b) the first and second events start and end at a same time.

5. The method of claim 1, wherein the shares operation is performed against multiple tables in the relational database, wherein each table is related to each other by a common column.

6. The method of claim 1, wherein the shares operation is performed against a single table having a plurality of columns, wherein each column tracks a different time period.

7. The method of claim 1, wherein the shares operation is invoked from a SQL query.

8. The method of claim 1, wherein the temporal relationships reflect any valid time period.

9. An apparatus for detecting shared temporal relationships in a relational database, comprising:

a computer; and one or more computer programs, performed by the computer, for receiving an invocation of a shares operation that specifies a first event and a second event, and in response to the invocation, evaluating a combination of temporal relationships between the first event and the second event to determine whether (a) the second event ends after the first event starts and the first event ends after the second event starts or (b) the first and second events start and end at a same time.

10. The apparatus of claim 9, wherein the evaluating evaluates whether the first event occurs during the second event.

11. The apparatus of claim 9, wherein the method further comprises the step of returning a TRUE value when the shares operation determines that (a) the second event ends after the first event starts and the first event ends after the second event starts or that (b) the first and second events start and end at a same time.

12. The apparatus of claim 9, wherein the method further comprises the step of returning a FALSE value when the shares operation fails to determine that (a) the second event ends after the first event starts and the first event ends after the second event starts or that (b) the first and second events start and end at a same time.

13. The apparatus of claim 9, wherein the shares operation is performed against multiple tables in the relational database, wherein each table is related to each other by a common column.

14. The apparatus of claim 9, wherein the shares operation is performed against a single table having a plurality of columns, wherein each column tracks a different time period.

15. The apparatus of claim 9, wherein the shares operation is invoked from a SQL query.

16. The apparatus of claim 9, wherein the temporal relationships reflect relationships for a period of days.

17. An article of manufacture comprising a computer program carrier readable by a computer and embodying one or more instructions executable by the computer to perform method steps for detecting shared temporal relationships in a relational database, the method comprises the steps of:

receiving an invocation of a shares operation that specifies a first event and a second event; and in response to the invocation, evaluating a combination of temporal relationships between the first event and the second event to determine whether (a) the second event ends after the first event starts and the first event ends after the second event starts or (b) the first and second events start and end at a same time.

18. The article of manufacture of claim 17, wherein the evaluating evaluates whether the first event occurs during the second event.

19. The article of manufacture of claim 17, wherein the method further comprises the step of returning a TRUE value when the shares operation determines that the second event ends after the first event starts and the first event ends after the second event starts or that the first and second events start and end at a same time.

20. The article of manufacture of claim 17, wherein the method further comprises the step of returning a FALSE value when the shares operation fails to determine that (a) the second event ends after the first event starts and the first event ends after the second event starts or that (b) the first and second events start and end at a same time.

21. The article of manufacture of claim 17, wherein the shares operation is performed against multiple tables in the relational database, wherein each table is related to each other by a common column.

22. The article of manufacture of claim 17, wherein the shares operation is performed against a single table having a plurality of columns, wherein each column tracks a different time period.

23. The article of manufacture of claim 15, wherein the shares operation is invoked from a SQL query.

24. The article of manufacture of claim 15, wherein the temporal relationships reflect any valid time period.

* * * * *

UNITED STATES PATENT AND TRADEMARK OFFICE
CERTIFICATE OF CORRECTION

PATENT NO. : 6,691,097 B1
DATED : February 10, 2004
INVENTOR(S) : Cynthia M. Saracco It is certified that error appears in the above-identified patent and that said Letters Patent is hereby corrected as shown below:

Column 14,
Line 24 and 26, "15" should read -- 17 --.

Signed and Sealed this

Seventeenth Day of August, 2004

JON W. DUDAS
*Acting Director of the United States Patent and Trademark Office*